US007751157B2

(12) United States Patent
Migliavacca

(10) Patent No.: US 7,751,157 B2
(45) Date of Patent: Jul. 6, 2010

(54) PROTECTION CIRCUIT AND METHOD THEREFOR

(75) Inventor: Paolo Migliavacca, Mauzac (FR)

(73) Assignee: Semiconductor Components Industries, LLC, Phoenix, AZ (US)

( * ) Notice: Subject to any disclaimer, the term of this patent is extended or adjusted under 35 U.S.C. 154(b) by 897 days.

(21) Appl. No.: 11/561,932

(22) Filed: Nov. 21, 2006

(65) Prior Publication Data

US 2008/0266739 A1 Oct. 30, 2008

(51) Int. Cl.
*H02H 7/00* (2006.01)

(52) U.S. Cl. ....................... 361/18; 361/91.1; 361/91.2; 361/91.5; 361/91.7; 323/276

(58) Field of Classification Search .................. 361/18, 361/91.1, 91.2, 91.5, 91.7; 323/276
See application file for complete search history.

(56) References Cited

U.S. PATENT DOCUMENTS

| | | | | | |
|---|---|---|---|---|---|
| 3,109,981 | A | * | 11/1963 | Muchnick | 323/276 |
| 3,697,861 | A | * | 10/1972 | Frazier | 323/277 |
| 4,008,418 | A | | 2/1977 | Murphy | |
| 4,405,964 | A | * | 9/1983 | Woods et al. | 361/18 |
| 4,884,161 | A | * | 11/1989 | Atherton et al. | 361/18 |
| 5,831,471 | A | * | 11/1998 | Nakajima et al. | 327/540 |
| 6,538,492 | B2 | * | 3/2003 | Sano et al. | 327/530 |
| 6,559,626 | B2 | * | 5/2003 | Horie | 323/282 |

* cited by examiner

*Primary Examiner*—Stephen W Jackson
*Assistant Examiner*—Terrence R Willoughby
(74) *Attorney, Agent, or Firm*—Robert F. Hightower

(57) ABSTRACT

In one embodiment, a protection circuit includes a linear regulator remains enabled during a portion of a time while limiting an output voltage of the linear regulator to a first value.

18 Claims, 5 Drawing Sheets

PROTECTION CIRCUIT AND METHOD THEREFOR

BACKGROUND OF THE INVENTION

The present invention relates, in general, to electronics, and more particularly, to methods of forming semiconductor devices and structure.

In the past, the semiconductor industry utilized various methods and structures to produce over-voltage and voltage transient protection circuits that could be used to protect various types of devices such as voltage regulators. These over-voltage and voltage transient protection circuits generally included a linear regulator that used a pass transistor and an operational amplifier to control an output voltage. During a transient or over-voltage event, the over-voltage protection circuit generally disabled the linear regulator and prevented regulation until the transient or over-voltage condition was eliminated. Because the linear regulator was disabled, the recovery time after the linear regulator was re-enabled usually was very long which caused variations in the output voltage. Additionally, the circuitry usually reacted slowly to the voltage transient which caused the output voltage to overshoot prior to the regulator being disabled. One example of such a transient protection circuit is described in U.S. Pat. No. 4,008,418 that issued on Feb. 15, 1997 that issued to Howard E. Murphy.

Accordingly, it is desirable to have a protection circuit that more accurately regulates the output voltage, that minimizes overshoots during a transient, avoids disabling the regulator, and that has a faster reaction time.

For simplicity and clarity of the illustration, elements in the figures are not necessarily to scale, and the same reference numbers in different figures denote the same elements. Additionally, descriptions and details of well-known steps and elements are omitted for simplicity of the description. As used herein current carrying electrode means an element of a device that carries current through the device such as a source or a drain of an MOS transistor or an emitter or a collector of a bipolar transistor or a cathode or anode of a diode, and a control electrode means an element of the device that controls current through the device such as a gate of an MOS transistor or a base of a bipolar transistor. Although the devices are explained herein as certain N-channel or P-Channel devices, a person of ordinary skill in the art will appreciate that complementary devices are also possible in accordance with the present invention. It will be appreciated by those skilled in the art that the words during, while, and when as used herein are not exact terms that mean an action takes place instantly upon an initiating action but that there may be some small but reasonable delay, such as a propagation delay, between the reaction that is initiated by the initial action.

DETAILED DESCRIPTION OF THE DRAWINGS

Figure 1:
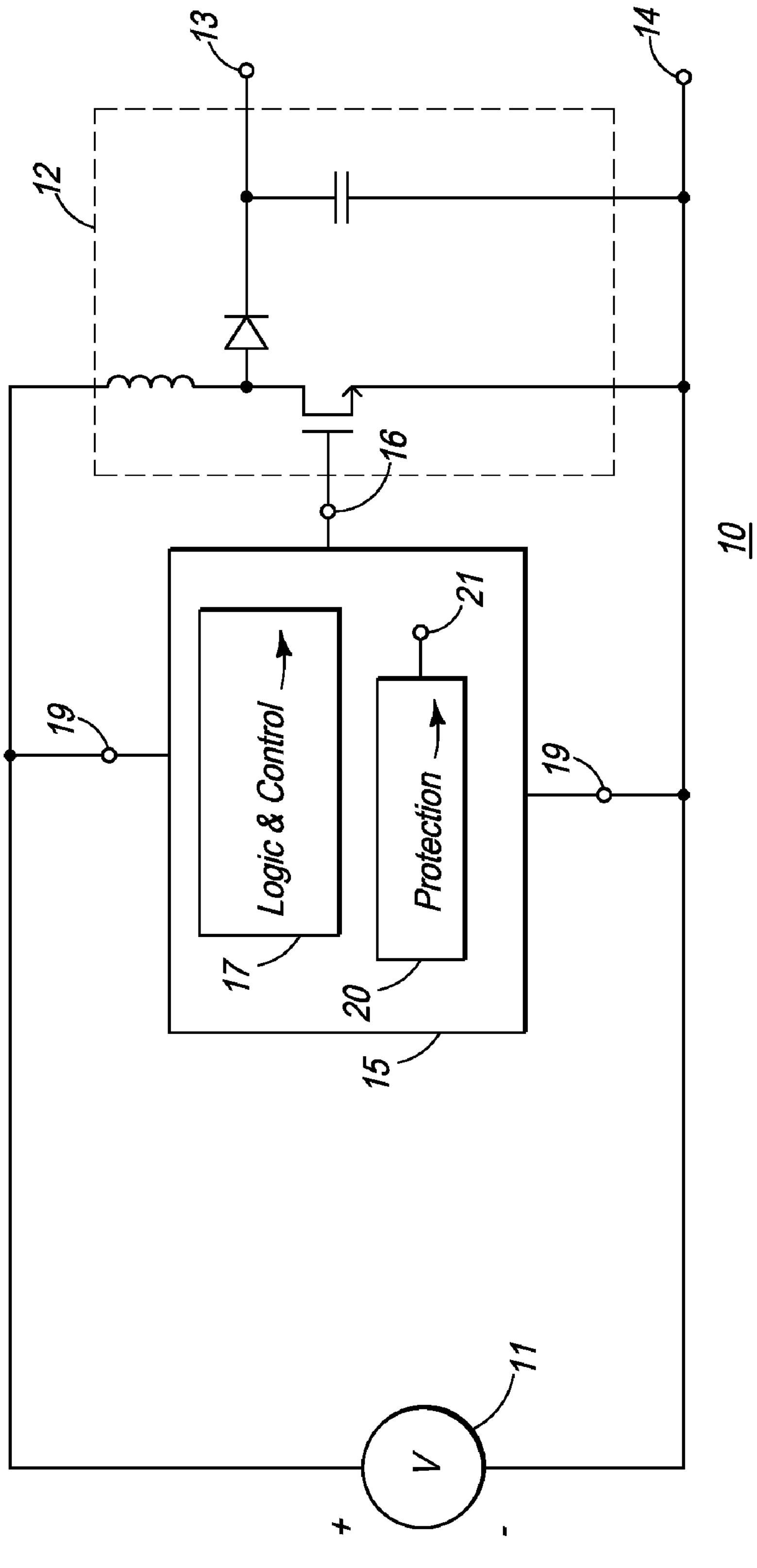
FIG. 1 schematically illustrates a generalized block diagram of an embodiment of a portion of a power supply system in accordance with the present invention.

FIG. 1 schematically illustrates a generalized block diagram of an embodiment of a portion of a power supply system 10. System 10 receives voltage and power from a voltage source 11, such as a battery, and provides an output voltage between an output 13 and a return 14 of system 10. System 10 includes a power supply controller 15 that controls the operation of a switch element 12 in order to regulate the output voltage of system 10. Controller 15 receives power between a voltage input 18 and a common return 19. Return 19 typically is connected to return 14 to provide a common voltage reference. Controller 15 includes a protection circuit 20 and a logic and control circuit 17. Controller 15 may be any type of power supply controller such as a pulse width modulated (PWM) controller, a pulse frequency modulated (PFM) controller, or other types of controllers that can be utilized to regulate the output voltage. Logic and control circuit 17 typically includes the PWM type of control circuits and logic that form a switching drive signal on an output 16 that is used to control switch element 12. Such control circuits and logic of power supply controllers are well known to those skilled in the art. Protection circuit 20 is explained subsequently.

Figure 2:
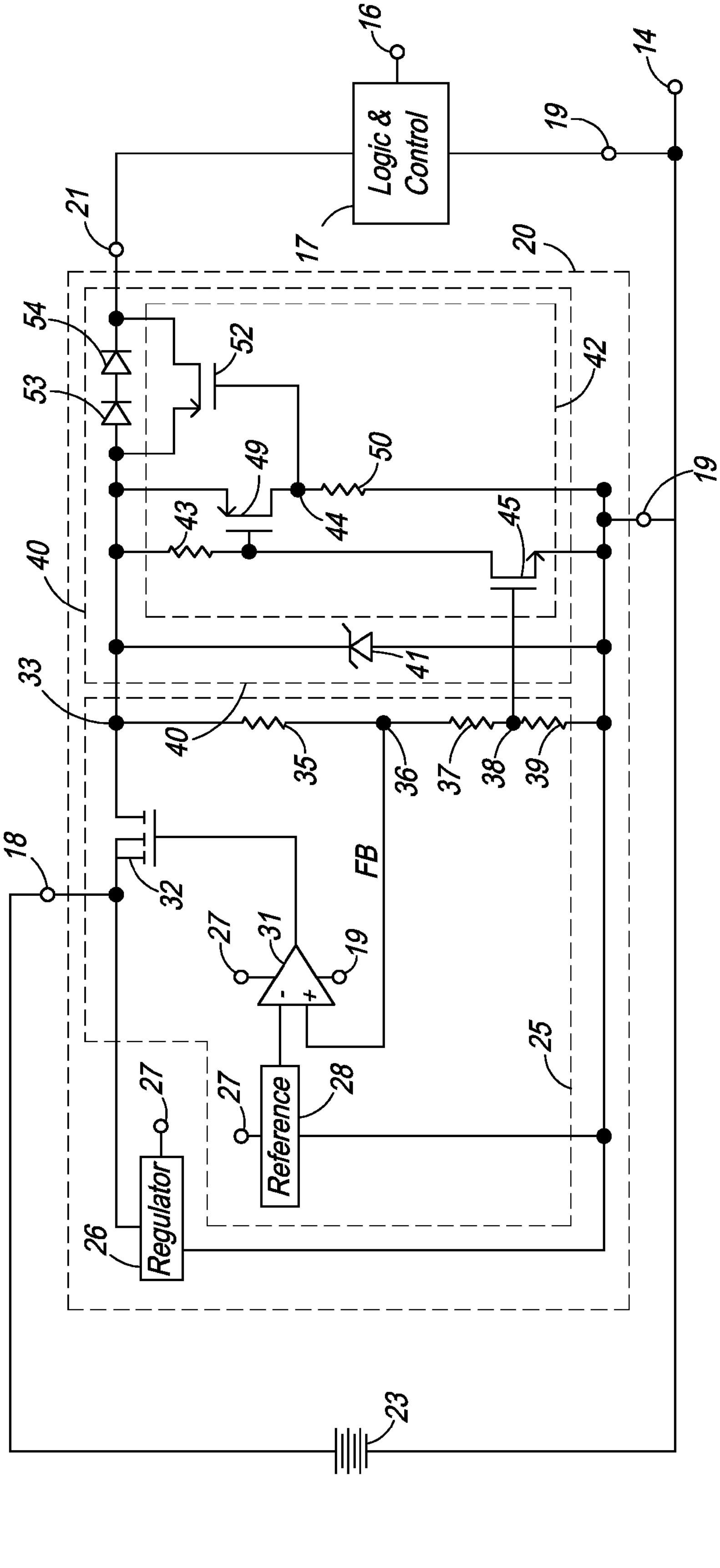
FIG. 2 schematically illustrates an embodiment of a portion of a protection circuit of the power supply system of FIG. 1 in accordance with the present invention.

FIG. 2 schematically illustrates an embodiment of a portion of protection circuit 20 that was illustrated in FIG. 1. Circuit 20 receives the input voltage that is between input 18 and return 19 and provides an output voltage between an output 21 and return 19. The output voltage provided by circuit 20 is substantially protected from rapid excursions of the input voltage. Circuit 20 includes a linear regulator section 25 and a protection section 40. As will be seen further hereinafter, circuit 20 is configured to detect input voltage excursions that cause an intermediate voltage or first voltage that is formed on an output of section 25 to increase to no less than a first value that is greater than a desired value of the intermediate voltage of section 25 and to keep linear regulator section 25 enabled while substantially preventing coupling the entire increase of the input voltage to the output voltage on output 21.

For the embodiment of circuit 20 that is illustrated in FIG. 2, voltage source 11 is represented by a battery 23. Linear regulator section 25 includes a reference generator or reference 28 that is utilized to form a reference voltage, an error amplifier 31, a series pass element illustrated as an MOS transistor 32, and a feedback (FB) network that provides a feedback (FB) signal that is representative of the intermediate voltage formed by section 25 at an output 33. For the embodiment illustrated in FIG. 2, the FB network includes resistors 35, 37, and 39 formed as a voltage divider that provides the FB signal at a FB node 36. Protection section 40 includes a clamp circuit that is connected between output 33 of section 25 and return 19. For the embodiment illustrated in FIG. 2, the clamp circuit is illustrated by a zener diode 41. Protection section 40 also has a threshold detector 42 that includes a threshold detect transistor 45, a control transistor 49, a transistor 52, and a voltage reduction element or voltage reduction circuit that is illustrated by diodes 53 and 54. Transistor 52 is connected in parallel with the voltage reduction circuit. Detector 42 also includes resistors 43 and 50. In some other embodiments, circuit 20 may also include an internal regulator (not shown) that receives the input voltage from input 18 and provides an internal operating voltage that may be used for operating some elements of circuit 20 such as reference 28 and amplifier 31.

Figure 3:
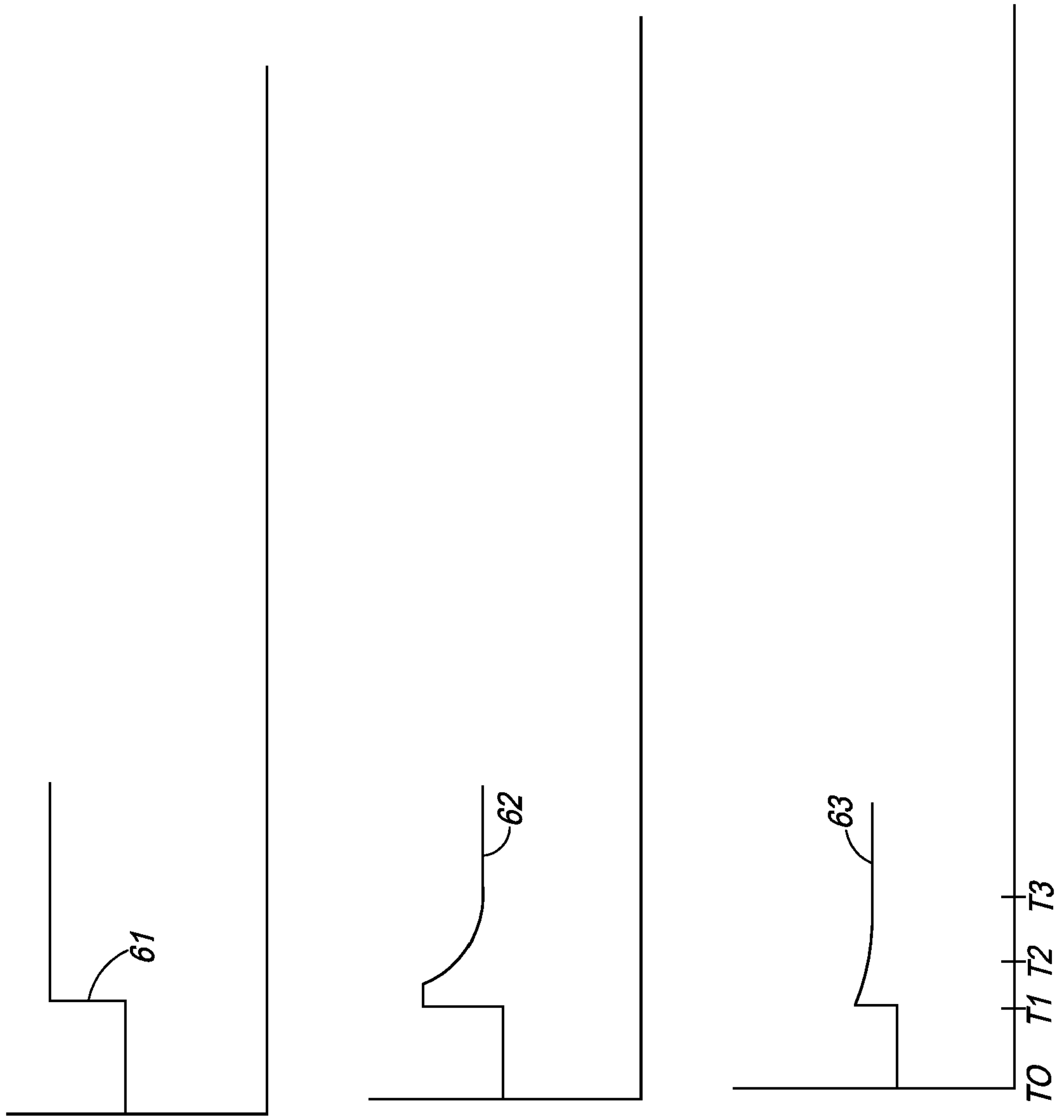
FIG. 3 is a graph having plots that illustrate some of the signals of protection circuit of FIG. 2 in accordance with the present invention.

FIG. 3 is a graph having plots that illustrate some of the signals of circuit 20. The abscissa indicates time and the ordinate indicates increasing value of the illustrated signal. A plot 61 illustrates the input voltage on input 18, a plot 62 illustrates the intermediate voltage on output 33 of section 25, and a plot 63 illustrates the output voltage on output 21. This description has references to FIG. 2 and FIG. 3. As illustrated in FIG. 3 by plots 61 and 62, between a time T0 and a time T1 circuit 20 receives the input voltage from input 18 and section 25 forms the intermediate voltage on output 33 of section 25. Error amplifier 31 receives the FB signal and the reference signal from reference 28 and forms a linear control signal on the output of amplifier 31 that controls the gate voltage of transistor 32 to regulate the intermediate voltage to a desired value. Typically, the desired value is target value within a range of values around the target value. For example, the target value may be approximately 3.5 volts and the range of values may be plus or minus five percent (5%) around the 3.5 volts. The voltage divider formed by resistors 35, 37, and 39 is selected so that the value of a sense signal formed on node 38 is less than the threshold value of transistor 45 as the intermediate voltage on output 33 varies within the range of voltages around the target value. Thus, in normal operation transistor 45 is disabled and resistor 43 pulls the gate of transistor 49 to the voltage of output 33 thereby disabling transistor 49. Since transistor 49 is disabled, resistor 50 pulls node 44 and the gate of transistor 52 toward the value of return 19 thereby enabling transistor 52. Enabling transistor 52 forms a current flow path around the voltage reduction circuit of diodes 53 and 54 thereby connecting the intermediate voltage on output 33 to output 21 and forming the output voltage on output 21. Thus, the output voltage is substantially equal to the intermediate voltage on output 33 as illustrated by plot 63 between times T0 and T1.

During the operation of circuit 20, it is possible that the value of the voltage received on input 18 could rapidly increase as illustrated by plot 61 at time T1. For example, a battery charger may be connected to battery 23 in order to charge battery 23. The voltage from the battery charger generally would be greater than the voltage from battery 23 and would rapidly increase the value of the voltage on input 18. Alternately, battery 23 may be replaced by a line adapter which may have a fault that causes the voltage on input 18 to quickly increase. If the value of the input voltage causes the intermediate voltage on output 33 to increase to a value that is greater than a first value, represented by the threshold voltage of transistor 45, threshold detector 42 enables the voltage reduction circuit of diodes 54 and 55 to decrease the value of the output voltage on output 21. Typically, the first value is greater than the upper limit of the values within the range of values of the desired value. Those skilled in the art will appreciate that amplifier 31 has a finite reaction time. Consequently, the increase in the input voltage may be coupled through transistor 32 to output 33, and the voltage on output 33 may temporarily increase above the first value for a period time before amplifier 31 can react. Threshold detector 42 is configured to detect the intermediate voltage on output 33 increasing to no greater than the first value and to responsively disable the current flow path around diodes 53 and 54 thereby coupling diodes 53 and 54 in series between output 33 and output 21. As the value of the voltage on output 33 increases to the first value, the voltage on node 38 increases to the threshold voltage of transistor 45 thereby enabling transistor 45. Enabling transistor 45 pulls the gate of transistor 49 low thereby enabling transistor 49 which couples node 44 and the gate of transistor 52 to a voltage substantially equal to the voltage on output 33. This disables transistor 52 which enables the voltage reduction circuit by terminating the current flow path around diodes 53 and 54 thereby connecting diodes 53 and 54 between transistor 32 and output 21. Connecting diodes 53 and 54 in series with transistor 32 subtracts the voltage drop across diodes 53 and 54 from the intermediate voltage and reduces the value of the output voltage on output 21 as illustrated by plot 63 after time T1. Preferably, transistors 45, 49, and 52 are formed to be small geometry transistors so that transistors 45, 49, and 52 can switch very rapidly and disable transistor 52 much more quickly than the response time of amplifier 31. Preferably, transistors 45, 49, and 52 are close to or at the minimum geometry for the technology used to produce transistors 45, 49, and 52. Generally, the change in the input voltage is much greater than the desired value on the intermediate voltage. The clamp circuit of diode 41 is configured to detect the intermediate voltage increasing to a second value that is greater than the first value and to substantially clamp output 33 to the second value. The zener voltage of diode 41, generally is greater than the first value as illustrated by plot 62 at time T2. For large increases in the input voltage, zener diode 41 may have to conduct large currents which may force the second value to be greater than the zener voltage of diode 41.

The control loop of regulator section 25 remains operating during and after the increase of the input voltage. However, the rapid increase in the input voltage may cause section 25 to loose regulation for a short time period as illustrated between times T1 and T2. After the input voltage increases, such as at time T2, the regulation loop of section 25 begins to recover and again regulate the value of the voltage on output 33 as illustrated by plot 62 between time T2 and T3. Transistor 52 remains disabled as long as the input voltage keeps the value of the intermediate voltage on output 33 greater than the first value. If the input voltage reduces and the value of the intermediate voltage on output 33 reduces below the first value, transistor 45 again becomes disabled and transistor 52 is enabled to again form the current flow path around diodes 53 and 54. Those skilled in the art will appreciate that if the input voltage decreases below the desired value of the intermediate voltage on output 33, that section 25 no longer regulates the intermediate voltage and the value of the intermediate voltage will follow the input voltage.

In one example embodiment, the value of the voltage on input 18 was at least approximately five volts (5 V) and the desired value of the voltage on output 33 was approximately 3.5 volts. For this example, the zener voltage of diode 41 was formed to be approximately 5.5 V, the voltage divider of resistors 35, 37, and 39 is formed to provide the threshold voltage of transistor 45 at node 38 when the value of the voltage on output 33 was approximately four volts (4.0 V), and each of diodes 53 and 54 are formed to have a forward voltage of approximately 0.7 volts. When the value of the input voltage increased to approximately 5.5 V, threshold detector 42 quickly disabled transistor 52 which dropped the voltage on output 21. As the input voltage increases forced the intermediate voltage on output 33 to increase above four volts, diode 41 clamped the voltage on output 33 to about 5.5 volts so the voltage drop of diodes 53 and 54 formed the output voltage to be about 4.1 volts. Without threshold detector 42, the output voltage on output 21 would increase to approximately 5.5 V and remain there until section 25 can recover to again regulate the output voltage.

In order to facilitate this functionality for circuit 20, reference 28 and error amplifier 31 are connected to receive operating power between input 18 and return 19. The output of reference 28 is connected to an inverting input of amplifier 31. A non-inverting input of amplifier 31 is connected to node 36, and the output of amplifier 31 is connected to a gate of transistor 32. A source of transistor 32 is connected to input 18 and a drain is connected to output 33 of section 25. A first terminal of resistor 35 is connected to output 33 and a second terminal is commonly connected to node 36 and a first terminal of resistor 37. A Second terminal of resistor 37 is commonly connected to node 38, a gate of transistor 45, and a first terminal of resistor 39. A second terminal of resistor 39 is connected to return 19. A cathode of diode 41 is connected to output 33 and an anode is connected to return 19. A first terminal of resistor 43 is connected to output 33 and a second terminal is commonly connected to a gate of transistor 49 and a drain of transistor 45. A source of transistor 45 is connected to return 19. A source of transistor 49 is commonly connected to an anode of diode 53, a source of transistor 52, and output 33. A drain of transistor 49 is commonly connected to node 44, a gate of transistor 52, and a first terminal of resistor 50. A second terminal of resistor 50 is connected to return 19. A drain of transistor 52 is connected to output 21 and a cathode of diode 54. An anode of diode 54 is connected to a cathode of diode 53.

Figure 4:
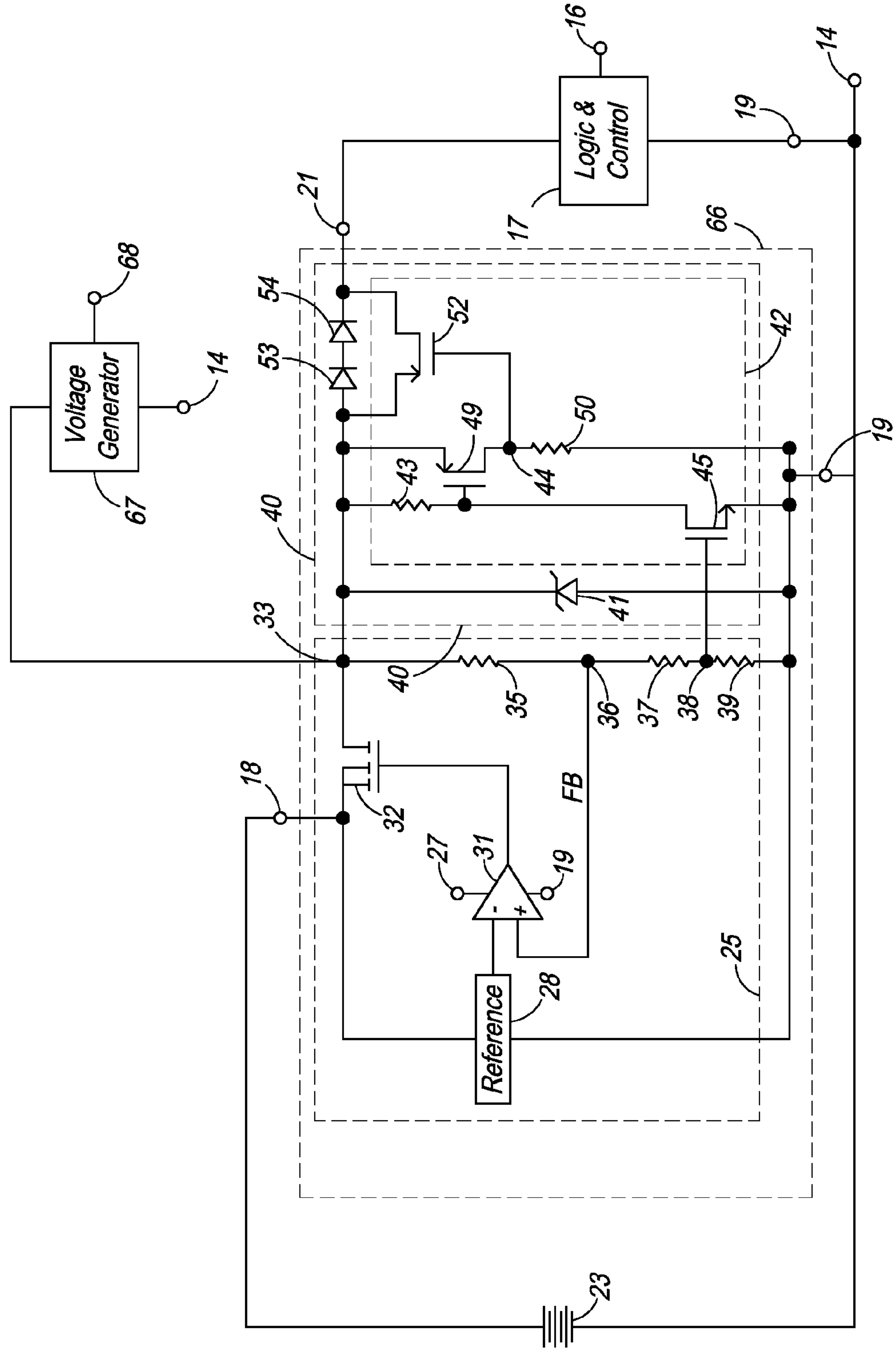
FIG. 4 schematically illustrates an embodiment of a portion of a protection circuit that is an alternate embodiment of the protection system of FIG. 2 in accordance with the present invention.

FIG. 4 schematically illustrates an embodiment of a portion of a protection circuit 66 that is an alternate embodiment of protection circuit 20 that was illustrated in FIG. 1. Circuit 66 is similar to circuit 20 except that circuit 66 is configured to regulate output 33 to an intermediate voltage value that is greater than the intermediate voltage value of circuit 20. As will be seen further hereinafter, circuit 66 is configured to receive the input voltage having a first value, regulate the intermediate voltage to a value that is less than the input voltage, and configured to form the output voltage on output 21 to have a value that is less than the first value without disabling the pass element of transistor 32. A second load, illustrated as a voltage generator 67, is connected to receive operating power between output 33 and return 14. The second load may be a variety of elements such as a charge pump circuit that is used to form another operating voltage on an output 68 that is used for operation other circuitry (not shown).

Resistors 35, 36, and 37 are selected to form the desired value of the intermediate voltage at a value that forms the sense signal on node 38 to be greater than the threshold voltage of transistor 45. In operation, if the input voltage is greater than the desired value the input voltage on input 18 is regulated to form a regulated voltage on output 33. The input voltage has to be greater than the desired value by at least the voltage dropped by transistor 32. For the embodiment illustrated in FIG. 4, the desired value of the intermediate voltage generally is a value that causes the sense signal on node 38 to be no less than the threshold voltage of transistor 45. Consequently, transistor 45 is enabled and transistor 52 is disabled, thus, the voltage reduction circuit of diodes 53 and 54 form the output voltage on output 21 to be less than the value of the intermediate voltage.

If the value of the input voltage decreases below the first value that causes the sense signal to decrease below the threshold voltage of transistor 45, transistor 45 becomes disabled and transistor 52 becomes enabled to form a current flow path around diodes 53 and 54 and form the output voltage to be substantially equal to the value of the intermediate voltage. For the embodiment illustrated in FIG. 4, this value of the input voltage is less than the desired value of the intermediate voltage, thus, regulator section 25 is not able to regulate the intermediate voltage and the intermediate voltage follows the input voltage. If a transient on the input voltage forces the input voltage to be greater than the second value, transistor 45 becomes enabled which enables the voltage reduction circuit of diodes 53 and 54, and diode 41 becomes enabled to clamp the value of the intermediate voltage. Because of the rapid increase of the input voltage, regulator section 25 is not able to regulate for a period of time. After the period of time, regulator section 25 begins to regulate the intermediate voltage to the desired value which also enables the voltage reduction circuit to form the output voltage to be less than the intermediate voltage. As long as the input voltage remains above the desired value plus the voltage drop across transistor 32, regulator section will regulate the intermediate voltage to the desired value.

For example, battery 23 may be charged to a voltage such as a voltage that is greater than five volts (5 V) and section 25 may regulate the intermediate voltage on output 33 to substantially five volts (5 V). Resistors 35, 37, and 39 may be selected to form the sense voltage to be no less than the threshold voltage of transistor 45 for values of the intermediate voltage that are no less than about four volts (4 V). Thus, for the input voltage value that is greater than the voltage that forms the sense signal to be no less than the threshold voltage of detector 42, transistor 45 is enabled and transistor 52 is disabled, thus, diodes 53 and 54 drop some of the intermediate voltage and form the output voltage to be less than the intermediate voltage. If battery 23 discharges down to a value that causes the sense voltage to reduce to less than the threshold voltage of transistor 45, transistor 45 becomes disabled and transistor 52 is enabled, thus, diodes 53 and 54 are shorted and the output voltage is formed to be substantially equal to the intermediate voltage. Since the input voltage has decreased below the value that is to be regulated by section 25, section 25 does not regulate the intermediate voltage and the intermediate voltage follows the input voltage.

However, if the input voltage quickly increases to a third value that is greater than the first value, such as the zener voltage of diode 41, diode 41 clamps output 33 to a value that is greater than the intermediate voltage. For example, the zener voltage of diode 41 may be 5.5 volts. If the input voltage increases past the zener voltage, diode 41 begins to conduct and clamps output 33 to the zener voltage. As stated hereinbefore, the input voltage may quickly increase to a value that is much greater than the zener voltage which may force diode 41 to conduct a large current thereby allowing the intermediate voltage to increase. However, after section 25 has sufficient time to recover, section 25 will regulate the intermediate voltage back down to the first value.

Figure 5:
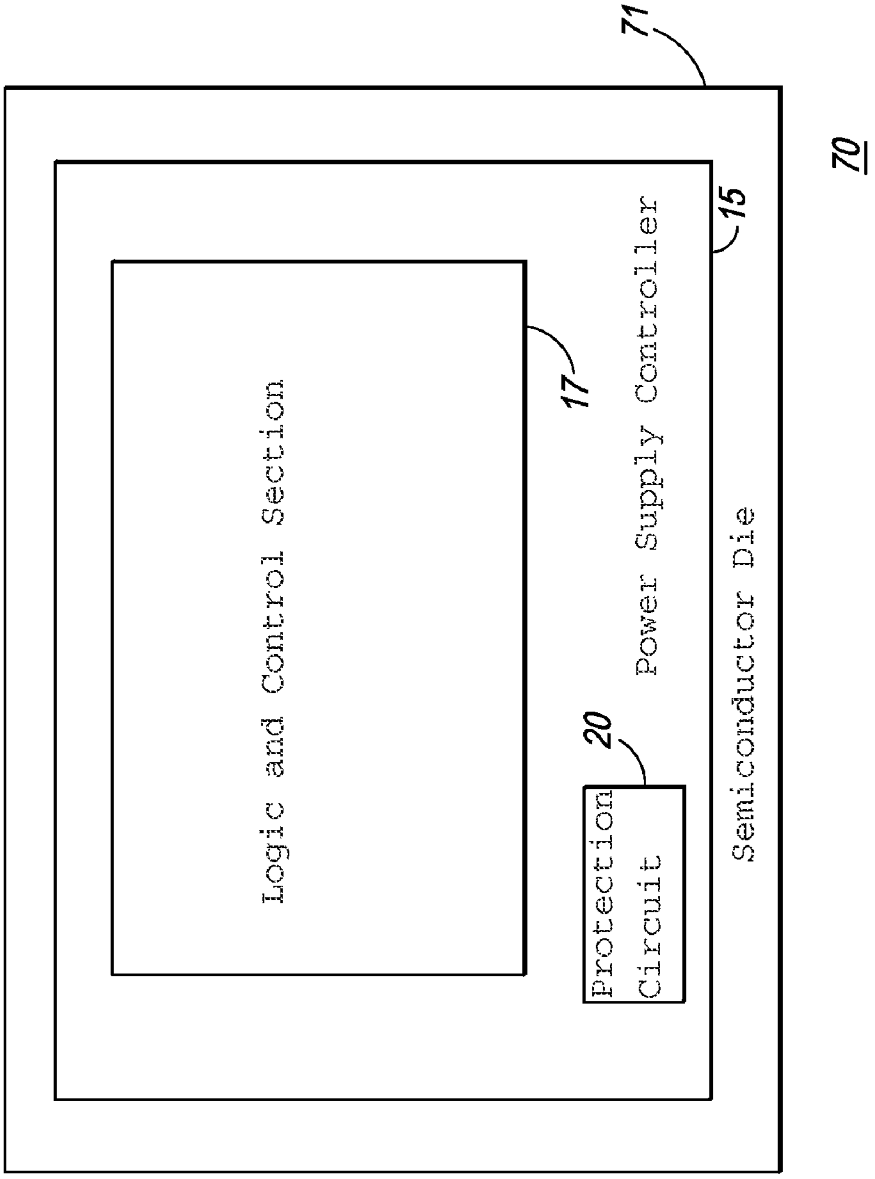
FIG. 5 schematically illustrates an enlarged plan view of a semiconductor device that includes the protection circuit of FIG. 2 in accordance with the present invention.

FIG. 5 schematically illustrates an enlarged plan view of a portion of an embodiment of a semiconductor device or integrated circuit 70 that is formed on a semiconductor die 71. Controller 15 including circuit 20 or circuit 66 is formed on die 71. Die 71 may also include other circuits that are not shown in FIG. 5 for simplicity of the drawing. Circuit 20 or circuit 66 and device or integrated circuit 70 are formed on die 71 by semiconductor manufacturing techniques that are well known to those skilled in the art.

In view of all of the above, it is evident that a novel device and method is disclosed. Included, among other features, is forming a protection circuit that does not disable the linear regulator section during a voltage transient of the input voltage. Additional, selectively enabling a voltage reduction responsively to the intermediate voltage being no less than the first value minimizes the increase in the output voltage.

While the subject matter of the invention is described with specific preferred embodiments, it is evident that many alternatives and variations will be apparent to those skilled in the semiconductor arts. For example, the voltage reduction circuit of diodes 53 and 54 may have more or fewer diode as required to provide a proper voltage drop between output 33 and output 21. Although circuit 20 is illustrated and described as providing power to a switching voltage regulator, circuit 20 may be used to provide the protect voltage to a variety of circuits that could use such a protected voltage such as a charge pump circuit, or any logic circuit. Also, the clamp circuit that is illustrated by diode 41 may be replaced with any type of circuit that provides a clamping type of function. Additionally, the word "connected" is used throughout for clarity of the description, however, it is intended to have the same meaning as the word "coupled". Accordingly, "connected" should be interpreted as including either a direct connection or an indirect connection.

The invention claimed is:

1. An over-voltage protection circuit for a linear voltage regulator comprising:

a pass transistor operably coupled to receive an input voltage and regulate an output voltage to substantially a desired value, the pass transistor having a first current carrying electrode coupled to receive the input voltage, a second current carrying electrode coupled to provide a first voltage that is used to form the output voltage, and a control electrode;

a plurality of diodes coupled in series between the second current carrying electrode of the pass transistor and an output of the over-voltage protection circuit;

a first transistor coupled in parallel with the plurality of diodes, the first transistor having a first current carrying electrode coupled to the second current carrying electrode of the pass transistor, a second current carrying electrode coupled to the output of the over-voltage protection circuit, and a control electrode; and a third transistor having a control electrode coupled to receive a sense signal that is representative of a voltage at the second current carrying electrode of the pass transistor and a first current carrying electrode coupled to provide a control signal that causes the first transistor to be disabled responsively to the first voltage increasing to a first value that is greater than the desired value and to cause the first transistor to be enabled responsively to the first voltage decreasing to less than the first value.

2. The over-voltage protection circuit of claim 1 further including a zener diode having a cathode coupled to the second current carrying electrode of the pass transistor and an anode coupled to a voltage return of the over-voltage protection circuit wherein the zener diode has a zener voltage that is greater than the first value.

3. The over-voltage protection circuit of claim 1 further including an error amplifier having an output coupled to the control electrode of the pass transistor and operable coupled to form a control signal cause the pass transistor to regulate the output voltage to substantially the desired value.

4. A voltage regulator having an over-voltage protection circuit comprising:

a series pass element coupled to receive an input voltage and form a first voltage that is used to provide an output voltage at an output of the over-voltage protection circuit, the series pass element including a first transistor having a first current carrying electrode coupled to receive the input voltage, a second current carrying electrode coupled to provide the first voltage, and a control electrode;

at least one voltage reducing element coupled in series between the second current carrying electrode of the series pass element and the output; and a threshold detector having first and second outputs coupled in parallel with the voltage reducing element wherein the threshold detector includes a second transistor having a first current carrying electrode coupled to the first output and a second current carrying electrode coupled to the second output, the threshold detector configured to receive a sense voltage that is representative of the first voltage and form a current flow path around the voltage reducing element responsively to the first voltage being less than a first value and to not form the current flow path around the voltage reducing element responsively to the first voltage being greater than the first value.

5. The over-voltage protection circuit of claim 4 further including a clamp circuit coupled to receive the first voltage and clamp the first voltage to a second value that is greater than the first value.

6. The over-voltage protection circuit of claim 5 wherein the clamp circuit includes a zener diode.

7. The over-voltage protection circuit of claim 4 wherein the at least one voltage reducing element includes a plurality of series connected diodes.

8. The over-voltage protection circuit of claim 4 wherein the threshold detector includes a third transistor coupled to receive the first voltage and cause the second transistor to be enabled and disabled responsively to the first value of the first voltage, the third transistor having a first current carrying electrode, a second current carrying electrode, and a control electrode.

9. The over-voltage protection circuit of claim 8 wherein the threshold detector further includes a fourth transistor coupled to receive an output of the third transistor and enable and disable the second transistor responsively to the output of the third transistor.

10. The over-voltage protection circuit of claim 8 wherein the control electrode of the third transistor is coupled to receive the sense voltage, the first current carrying electrode is coupled to receive the first voltage, and the second current carrying electrode is coupled to a voltage return of the over-voltage protection circuit.

11. The over-voltage protection circuit of claim 10 wherein the threshold detector further includes a fourth transistor having a control electrode coupled to the second current carrying electrode of the third transistor, a first current carrying electrode coupled to the first output of the threshold detector, and a second currying electrode coupled to the second output of the threshold detector.

12. The over-voltage protection circuit of claim 4 wherein the series pass element is configured to remain enabled responsively to the threshold detector not forming the current flow path around the voltage reducing element.

13. A method of forming an over-voltage protection circuit comprising:

configuring a pass element to receive an input voltage and regulate a first voltage substantially to a desired voltage;

coupling a voltage reducing element in series between the pass element and an output of the over-voltage protection circuit; and configuring a threshold detector to detect the first voltage increasing to a first value that is greater than the desired value and responsively reduce the first value without disabling the pass element including configuring the threshold detector to form a current flow path around the voltage reducing element responsively to the first voltage being less than the first value and to substantially terminate the current flow path around the voltage reducing element responsively to the first voltage being greater than the first value.

14. The method of claim 13 wherein configuring the pass element to receive the input voltage and regulate the first voltage includes coupling a first transistor to receive the input voltage and form the first voltage, and coupling an error amplifier to receive a feedback voltage that is representative of the first voltage and responsively form a linear control signal to linearly control the first transistor and regulate the first voltage.

15. A method of forming an over-voltage protection circuit comprising:

configuring a pass element to receive an input voltage and regulate a first voltage substantially to a first value;

coupling a voltage reducing element in series between the pass element and an output of the over-voltage protection circuit;

configuring a threshold detector to detect the first voltage having a second value that is less than the first value and responsively form an output voltage that is less than the first value without disabling the pass element including coupling a first transistor in parallel with the voltage reducing element, and operably configuring the threshold detector to enable the first transistor to form a current flow path around the voltage reducing element and to disable the first transistor to substantially terminate the current flow path.

16. The method of claim 15 wherein coupling the first transistor in parallel with the voltage reducing element includes coupling the first transistor in parallel with a plurality of diodes and further including operably coupling a second transistor to receive a sense signal that is representative of the first voltage and responsively control enabling and disabling the second transistor.

17. The method of claim 15 further including coupling a clamp circuit to detect the first voltage increasing to a third value that is greater than the first value and responsively clamp the first voltage to a value that is no less than the third value.

18. The method of claim 17 wherein coupling the clamp circuit to detect the first voltage includes coupling a zener diode.

* * * * *